United States Patent [19]

Itoi

[11] Patent Number: 5,167,741
[45] Date of Patent: Dec. 1, 1992

[54] METHOD OF MAKING A FABRIC SAMPLE

[76] Inventor: Touru Itoi, 861-11 Komatsuri-cho, Kishiwada-shi Oska-fu 569, Japan

[21] Appl. No.: 751,578

[22] Filed: Aug. 22, 1991

Related U.S. Application Data

[63] Continuation-in-part of Ser. No. 515,690, Jun. 13, 1988, abandoned, which is a continuation of Ser. No. 17,230, Feb. 20, 1987, abandoned.

[30] Foreign Application Priority Data

Jul. 9, 1986 [JP] Japan ............................. 61-161542
Jul. 30, 1986 [JP] Japan ............................. 61-179433

[51] Int. Cl.$^5$ ..................... B31C 13/00; B65H 81/00
[52] U.S. Cl. .................................. 156/169; 156/174; 156/161
[58] Field of Search ............... 156/169, 173, 174, 175, 156/181, 161, 162, 433, 289; 525/55; 524/500, 81

[56] References Cited

U.S. PATENT DOCUMENTS

| | | | |
|---|---|---|---|
| 2,107,067 | 2/1938 | Alderfer | 156/162 X |
| 2,131,024 | 9/1938 | Cordts | 156/174 X |
| 3,236,711 | 2/1966 | Adler | 156/174 |
| 3,454,457 | 7/1969 | Hale et al. | 156/289 |
| 3,753,842 | 8/1973 | Pittman. | |
| 4,319,938 | 3/1982 | Vives | 156/289 |
| 4,596,619 | 6/1986 | Marks | 156/173 X |

FOREIGN PATENT DOCUMENTS

| | | | |
|---|---|---|---|
| 252220 | 1/1988 | European Pat. Off. | 156/174 |
| 0982420 | 6/1943 | France. | |
| 1309842 | 7/1961 | France. | |
| 2199026 | 9/1972 | France. | |
| 449223 | 6/1936 | United Kingdom | 156/174 |
| 0688827 | 3/1953 | United Kingdom. | |

*Primary Examiner*—Jeff H. Aftergut
*Attorney, Agent, or Firm*—Kanesaka & Takeuchi

[57] ABSTRACT

A method of making a fabric sample, which includes the steps of winding a thread around a Teflon-coated core plate in a first direction to form a first layer of thread; spraying a transparent hotmelt adhesive to the first layer of thread; winding a thread around the first layer of thread on the core plate in a second direction at an angle with respect to the first direction to form a second layer of thread; placing a Teflon sheet on the second layer; placing a heated iron upon the Teflon sheet so that the hotmelt adhesive is cured to form a tubular fabric structure; and cutting the tubular fabric structure into a flat fabric sample.

2 Claims, 2 Drawing Sheets

METHOD OF MAKING A FABRIC SAMPLE

CROSS-REFERENCES TO RELATED APPLICATIONS

This application is a continuation-in-part of U.S. Ser. No. 515,690 filed Jun. 13, 1988, now abandoned, which is a continuation of Ser. No. 017,230 filed Feb. 20, 1987 now abandoned.

BACKGROUND OF THE INVENTION

The present invention relates generally to methods of making a fabric sample and, more particularly, to a simple method of making a fabric sample which is substantially the same in pattern as a cut sample of woven fabric.

Before the mass production of a fabric by means of a weaving machine, the designer must select the material, quality, color and density of warp and weft threads by his design and weave a fabric sample with the warp and weft threads by means of a special weaving machine. The designer then makes a decision whether the woven sample is satisfactory. If it is found unsatisfactory, he must repeat the above operation until he finds a satisfactory sample.

The above special weaving machine for making fabric samples has functions equivalent to those of weaving machines for use in the commercial mass-production so that it becomes large and expensive. It produces a fabric sample in large quantity at a time even when no such large quantity is required as a sample. Furthermore, the operation of this machine requires an operator as skillful as that of a mass-production machine.

SUMMARY OF THE INVENTION

Accordingly, it is an object of the present invention to provide a simple method of making a fabric sample, by which any fabric designer who is not particularly skillful in operating a weaving machine, may make a fabric sample without difficult.

Another object of the invention is to provide an economical method of making a fabric sample permitting the production of a fabric in just enough quantity as a sample.

According to the invention, the above object may be achieved by a method of making a fabric sample, which includes the steps of winding a thread around a Teflon-coated core plate in a first direction to form a first layer of thread; spraying a transparent hotmelt adhesive to the first layer of thread; winding a thread around the first layer of thread on the core plate in a second direction at an angle with respect to the first direction to form a second layer of thread; placing a Teflon sheet on the second layer; placing a heated iron upon the Teflon sheet so that the hotmelt adhesive is hardened to form a tubular fabric structure; and cutting the tubular fabric structure into a flat fabric sample.

Other objects, features and advantages of the invention will be apparent from the following description taken in conjunction with the accompanying drawings.

DESCRIPTION OF THE PREFERRED EMBODIMENT

Figure 1:
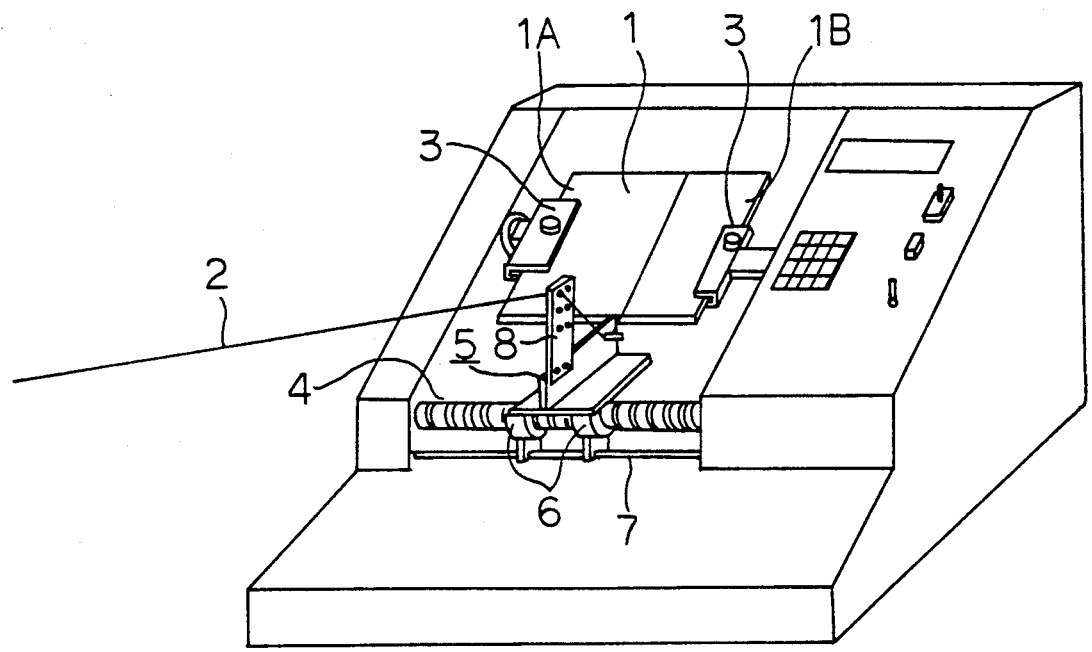
FIG. 1 is a perspective view of a machine for winding warp and weft threads around a core plate for use in a method of the invention.

FIG. 1 shows a machine for winding warp and weft threads around a core plate 1, which includes a pair of chucks 3 facing each other to hold the core plate 1 at both ends 1A and 1B, a worm gear 4 extending in a direction parallel to the rotational axis 1 (FIG. 2) of the core plate 1, and a guide 5 which is moved by the rotation of the worm gear 4 for guiding a warp or weft thread horizontally.

The guide 5 includes a pair of gear wheels 6 engaging the worm gear 4, a rotation preventive guide rod 7, and a vertical plate 8 having holes through which a warp or weft thread 2 extends from a spindle (not shown) to the core plate 1. A thread of each color is wound around the core plate 1 at right angles to the rotational axis 1 while the guide 5 is moved in synchronism with the rotation of the core plate 1.

Figure 2:
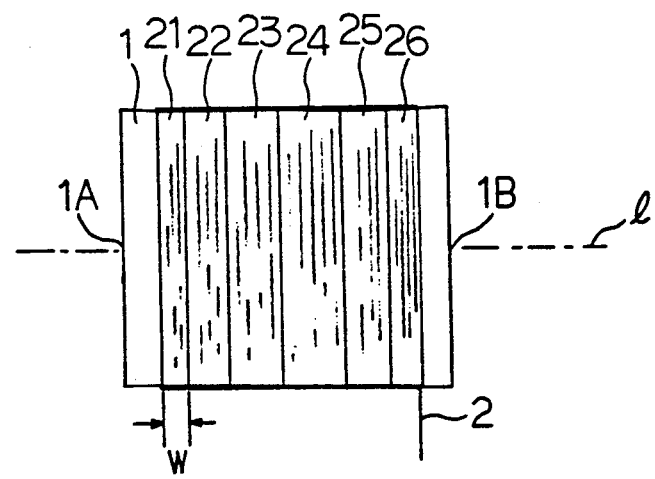
FIG. 2 is a plan view of the core plate around which each thread of a predetermined color is wound in a predetermined number of turns.

FIG. 2 shows the core plate 1. The warp threads 2 are wound around the core plate 1 from one end 1A to the other end 1B by rotating the core plate 1 about its axis 1. The color and number of turns of each warp thread 2 are changed in a predetermined pattern. For example, the color and number of turns are red and 15 for the first warp thread 21, yellow and 20 for the second warp thread 22, green and 25 for the third warp thread 23, white and 30 for the fourth warp thread, red and 20 for the fifth warp thread 25, and gray and 15 for the sixth warp thread 26. The result is a stripe pattern with each stripe different in color and width W from each other. Preferably the core plate 1 is a rectangular metal plate coated with Teflon(polytetrafluoroethylene) so that the warp and weft threads are not bonded to the core plate with an adhesive during the process described hereinafter.

To start the winding operation, the leading end of the first warp thread 21 of a predetermined color, red in this case, is fixed to the core plate 1 with an adhesive tape and then the warp thread is wound around the core plate 1 by rotating the core plate 1 by a predetermined number of turns, 15 in this case. Then, the end of the first warp thread 21 is tied to the second warp thread 22 of a predetermined color, yellow in this case, which is then wound around the core plate 1 by rotating it by a predetermined number of turns, 20 in this case. In this way, the warp threads are continuously wound around the core plate 1. The machine of FIG. 1 is much simpler in construction than the conventional machines for weaving fabric samples.

Figure 6:
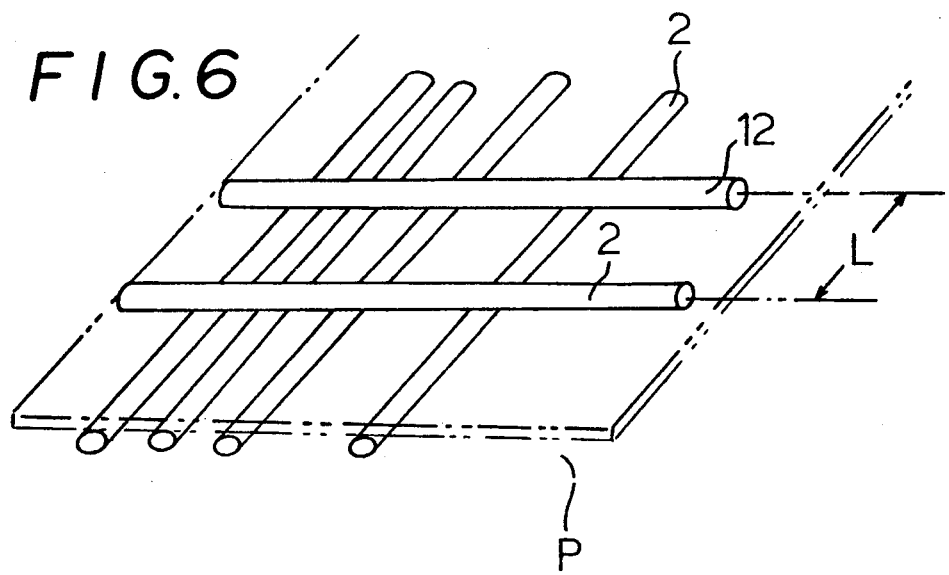
FIG. 6 is an enlarged perspective view of the fabric sample showing warp and weft threads bonded together with the hotmelt adhesive.

Upon completion of the winding of the warp threads 2 to form the first stripe pattern, a weft thread 12 (FIG. 3) is wound around the core plate 1 which has been turned by 90 degrees from the state shown in FIG. 2 and set in the chucks 3. The weft thread 12 is wound on the warp threads around the core plate 1 at right angles with the warp threads. The color and number of turns are changed likewise. The weft threads wound around the core plate 1 are spaced so as to provide a distance L between them, with the result that the warp threads 2 may be seen through the spaces (FIG. 6).

Figure 3:
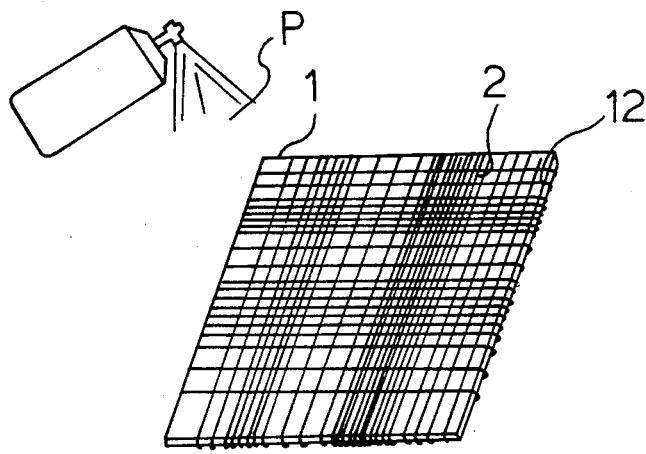
FIG. 3 is a perspective view of the core plate around which warp and weft threads are wound and to which a hotmelt adhesive is being sprayed.

As shown in FIG. 3, a transparent hotmelt synthetic resin adhesive P is sprayed over the entire surface of the fabric structure of the warp threads 2 and the weft threads 12. The transparent hotmelt synthetic resin adhesive P may be prepared by mixing 2% to 30% by weight of a hotmelt adhesive, 600 microns in particle size and insoluble in a volatile organic solvent, and the balance of a solution of 0.1% to 10% by weight of a high-molecular weight hotmelt adhesive in a volatile organic solvent. Examples of the hotmelt adhesive are polyamide, polyester, polyethylene, and ethylenevinyl. An example of the high-molecular weight hotmelt adhesive is an epoxy resin adhesive having a bisphenol epoxy resin as a major constituent. Examples of the volatile organic solvent are benzene and alcohols. The hotmelt adhesive thus prepared is able to bond strongly warp and weft threads of even all-wool yarn at temperatures as low as about 80 degrees C.

If the first hotmelt adhesive constituent is not insoluble, it would permeate into the fabric and fail to give satisfactory adhesion but give stains when heated and bonded. If the particle size of the first hotmelt adhesive constituent exceeds 600 microns, not only good spray pattern would not be obtained but also the valve of a spray would be clogged. With less than 2% by weight of the first hotmelt adhesive constituent, the resultant adhesive would fail to provide satisfactory adhesion while, with more than 30% of the first hotmelt adhesive constituent, the resulting adhesive would provide poor spray properties and tend to clog the valve of a spray.

The solution of the high-molecular weight hotmelt adhesive is used as a binder between the above first hotmelt adhesive constituent and the fabric. With less than 0.1% of the solid high-molecular weight hotmelt constituent, the binder property is so poor that the insoluble particles of the hotmelt adhesive fall off from the fabric. With more than 20% of the solid constituent, the valve would be clogged.

Figure 5:
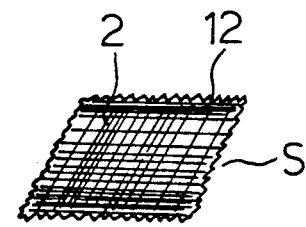
FIG. 5 is a perspective view of a fabric sample obtained by a method of the invention.
Figure 4:
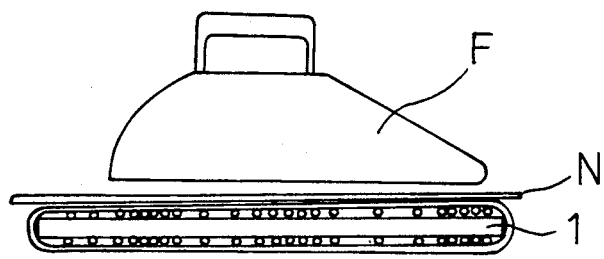
FIG. 4 is a side view of the core plate with warp and weft threads wound therearound, on which an iron is placed.

As shown in FIG. 4, a sheet of Teflon film N is placed on the warp 2 and weft 12 and then an iron F heated to temperatures ranging from 70 to 90 degrees C., preferably about 80 degrees C is placed on the Teflon film N for a period between 1 and 2 minutes to bond the warp and weft with the hotmelt adhesive. Then, by cutting the tubular fabric structure in a desired size by means of a cutter, such as a knife, to provide a flat fabric sample such as shown in FIG. 5.

The fabric sample thus obtained may be pasted on a sample card or board. With the use of the above quickly-drying hotmelt adhesive, it is possible to make fabric samples in a short time. Also, the above hotmelt adhesive may be sprayed before the weft threads are wound on the warp threads. By doing so, the adhesive may be covered by the weft threads so that the undesired luster after the adhesive is hardened, is concealed thus giving the fabric sample of a more natural feeling than before.

By the method of the invention with the aid of the above winding machine, any fabric designer who is not particularly skillful in operating a weaving machine, may make a fabric sample very economically.

While a preferred embodiment of the invention has been described using specific terms, such description is illustrative purposes only, and it is to be understood that changes and variations may be made without departing from the spirit and scope of the invention as recited in the following claims.

What is claimed is:

1. A method of making a fabric sample, which comprises the steps of:

coating a rectangular metal plate with polytetrafluoroethylene to form a core plate;

winding warp threads each having a predetermined color around said core plate by a predetermined number of turns to form a warp stripe pattern with each stripe having a predetermined width;

winding weft threads each having a predetermined color over said warp stripe pattern by a predetermined number of turns to form a weft stripe pattern laid at right angles with said warp stripe pattern, said weft threads being spaced so that said warp stripe pattern is seen through said warp stripe pattern;

spraying over said weft stripe pattern a transparent hotmelt adhesive;

placing a sheet of polytetrafluoroethylene on said weft stripe pattern; and placing on said sheet an iron heated to a temperature between 70 and 90 degrees C. for a period between one and two minutes so that said hotmelt adhesive bonds said warp and weft threads together, providing a fabric sample quickly and economically.

2. A method of making a fabric sample, which comprises the steps of:

coating a rectangular metal plate with polytetrafluoroethylene to form a core plate;

winding warp threads each having a predetermined color around said core plate by a predetermined number of turns to form a warp stripe pattern with each stripe having a predetermined width;

spraying over said warp stripe pattern a transparent hotmelt adhesive;

winding weft threads each having a predetermined color over said warp stripe pattern by a predetermined number of turns to form a weft stripe pattern laid at right angles with said warp stripe pattern, said weft threads being spaced so that said warp stripe pattern is seen through said warp stripe pattern;

placing a sheet of polytetrafluoroethylene on said weft stripe pattern; and placing a sheet of polytetrafluoroethylene on said weft stripe pattern; and placing on said sheet an iron heated to a temperature between 70 and 90 degrees C. for a period between one and two minutes so that said hotmelt adhesive bonds said warp and weft threads together, providing a fabric sample quickly and economically.

* * * * *